United States Patent [19]

Showalter

[11] Patent Number: 4,470,388

[45] Date of Patent: Sep. 11, 1984

[54] FULLY HYDRODYNAMIC PISTON RING AND CYLINDER ASSEMBLY

[75] Inventor: Merle R. Showalter, Madison, Wis.

[73] Assignee: Automotive Engine Associates, Madison, Wis.

[21] Appl. No.: 502,578

[22] Filed: Jun. 9, 1983

[51] Int. Cl.³ .............................................. F02F 5/00
[52] U.S. Cl. ................................. 123/193 P; 92/158; 277/216
[58] Field of Search ............. 123/41.35, 193 P, 193 C, 123/193 D; 92/158, 160, 177, 186; 277/216, 217, 218, 219; 165/41, 51

[56] References Cited

U.S. PATENT DOCUMENTS

| | | | |
|---|---|---|---|
| 3,727,927 | 4/1973 | Packard | 277/216 |
| 4,178,899 | 12/1979 | Julich | 123/193 P |
| 4,318,386 | 3/1982 | Showalter et al. | 123/549 |
| 4,359,973 | 11/1982 | Shimada | 123/41.35 |
| 4,362,136 | 12/1982 | Lipp | 123/193 P |

Primary Examiner—William A. Cuchlinski, Jr.
Attorney, Agent, or Firm—Witherspoon & Hargest

[57] ABSTRACT

A piston ring and cylinder assembly designed for fully hydrodynamic operation with oil control is disclosed. The rings are loaded in circumferential compression and are flexible. They conform instantaneously to cylinder wall distortions and oil film forces. The elastic properties of the ring, combined with the ring crown geometry maintain oil control (zero oil pumping to the top of the cylinder wall) with fully hydrodynamic conditions between ring and cylinder wall. The cylinder wall is finished to a very smooth surface and may be provided with a number of axial grooves near the top dead center position of the top ring so that oil is positively blown down from the top of the cylinder for oil control.

12 Claims, 10 Drawing Figures

$$W = \frac{f_1\left[\frac{h_i}{h_o}, P_{IN}\right] \mu VR}{h_o} \qquad h_o = \frac{f_1\left[\frac{h_i}{h_o}, P_{IN}\right] \mu VR}{W}$$

R = CROWN RADIUS
$P_{IN}$ = VAPOR PRESS. OF AIR IN OIL AT $h_i$
$\mu$ = OIL VISCOSITY
W = FORCE ON CROWN
V = SLIDING VELOCITY
$h_i$ = INITIAL FILM THICKNESS $h_o$ = MINIMUM FILM THICKNESS $h_s$ = SEPARATION FILM THICKNESS

TDC

FULLY HYDRODYNAMIC PISTON RING AND CYLINDER ASSEMBLY

BACKGROUND AND OBJECTS

Current piston ring assemblies in internal combustion engines have very high friction. Substantial fuel economy gains are available if it is possible to reduce this operating friction. Calculation indicates that piston ring friction would be cut by more than a factor of 10 if the piston rings functioned as optimally designed bearings. Currently, ring assemblies operate with very thin oil films, largely because the ring assemblies include oil scrapers which scrape the oil layer on the cylinder wall down to extremely thin films.

It is worthwhile to review the fundamentals required for design of a low friction piston ring assembly. Sliding parts operating with full oil films have much lower friction than parts sliding in the boundary lubrication regime. The friction for a full film is inverse with film thickness. There is, therefore, a strong incentive to produce the thickest possible oil films between sliding parts. Thick, low friction oil films are set up by wedge film geometries. The basic equation for oil wedges is Reynold's equation, which is explained thoroughly in a number of textbooks and references (i.e. p. 3-4 *Standard Handbook of Lubrication Engineering*, O'Connor and Boyd, McGraw-Hill, New York, 1968). The application of Reynold's equation is well understood in cases that involve fully convergent wedges. In cases involving geometries with both convergent and divergent sections the equation is easily applied for heavily loaded cases. Hydrodynamic lubrication has been exhaustively treated in the literature. It is an area of mechanical engineering where exact mathematical equations are known to work within any reasonable experimental error.

The convergent angles and geometrical relations of hydrodynamic film physics involve very critical geometrical issues. The heavy loads occurring in engines invariably deform the parts in a way which affects the film forming geometry and the friction. The film thicknesses and geometrical relations required for optimal full-film physics often require geometrical precision not reasonably obtainable in production. Moreover, heavy loads produce deformations such that the oil film forming geometry varies from the geometries which would occur if the engine parts were infinitely stiff. Differential expansion of parts also alters film forming geometry. It is a purpose of the present invention to present piston ring designs where the rings conform elastically. The ring deformations automatically adjust geometry to maximize oil film stability and minimize friction. Optimization of flexibility of the rings permits fine scale adjustment of film forming geometry which is impossible with production tolerances alone, particularly when differential expansion of parts is considered.

The flexible rings are mounted in circumferential compression with end-gap springs. This elastic arrangement permits the rings to follow cylinder bore out-of-round distortions as the piston moves. The ring pack is arranged with each ring crowned so that its interaction with the cylinder wall oil film is essentially cylinder on flat plate fluid mechanics. The combination of spring forces, gas actuating forces, and radii of crown curvature produces a situation where the bottom ring, called the oil control ring, is always fully flooded and the other rings are operated in a partially starved but fully hydrodynamic condition. The rings should have essentially zero wear and extremely low friction. The ring assembly does not have a conventional scraper. This allows fully flooded lubrication of the piston skirts. In the place in the piston where an oil scraper might ordinarily be is a groove functioning as an oil reservoir to assure that the cylinder wall and ring pack stay flooded.

It is desirable to have a ring package which functions with full film lubrication at all times. This requires thicker cylinder wall oil films than now occur. It is expected that with the combination of a smooth cylinder wall and the disclosed rings, oil control can be achieved. However, for some applications it may be useful to modify the cylinder wall near the top dead center positon of the top ring with a large number of shallow axial grooves, which will serve as compression blowdown paths to actively blow oil down from the top of the cylinder for oil control. This is an assured way to get oil control, and permits the rings to operate with thicker oil films than would otherwise be practical.

IN THE DRAWINGS

DETAILED DISCUSSION

Figure 1:
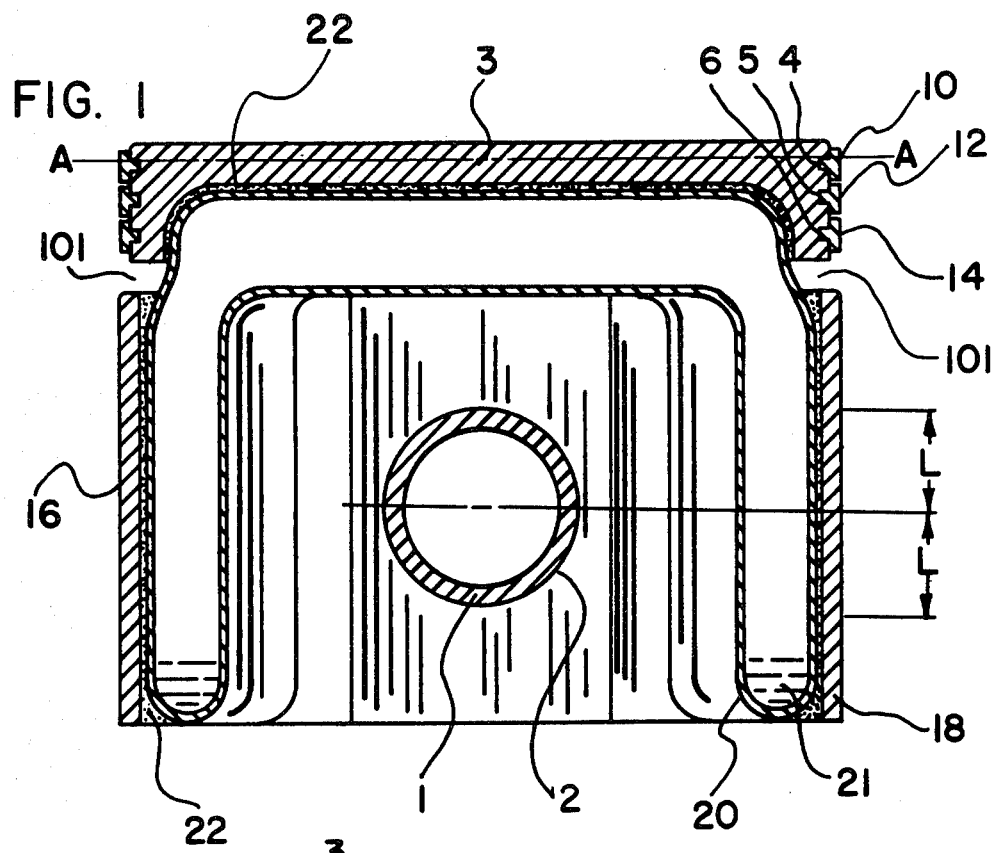
FIG. 1 shows a central sectional view perpendicular to the wrist pin of a special heat pipe equipped piston mounting the flexible piston rings.

FIG. 1 shows a central sectional view perpendicular to the wrist pin of a specially cooled piston which mounts the flexible piston rings. Wrist pin 1 rides in wrist pin boss 2 which is integrally connected to piston crown 3. On the sides of the piston crown are circumferential grooves 4, 5 and 6 in which are mounted circumferentially loaded flexible and hydrodynamic piston rings 10, 12 and 14. Rings 10 and 12 have a preferred cylindrical crown radius of curvature of the order of two (2) inches (50.8 mm). Since such a crown would be indistinguishable from a line in the drawing, the crown shown is exaggerated for clarity. Ring 14, which functions to ration oil flow to the rings 10 and 12, has a cylindrical crown radius of curvature which is substantially less than the crown radius of rings 10 and 12 (for example, ¼ inch).

Piston skirts 16 and 18 are designed to be flexible and to function as centrally pivoted pivoted plane sliders. Inside the piston assembly is heat piped assembly 20, which forms a very high conductance thermal connection between piston crown 3 and skirts 16 and 18. Heat piped assembly 20 consists of an evacuated metallic passage with about 2-3% of its internal volume filled with working fluid 21, which transfers heat by evaporation and condensation at relatively low pressures as the piston operates. Heat piped assembly 20 is adhesively bonded to piston crown 3 and skirts 16 and 18 with high thermal conductance (metal-filled) silicone rubber or like material 22. The function of heat pipe 20 is to hold the piston assembly nearly isothermal, and substantially reduce the heat transfer across the oil film of the hydrodynamic rings so as to maximize the viscosity of oil on which the piston rings ride.

Figure 2:
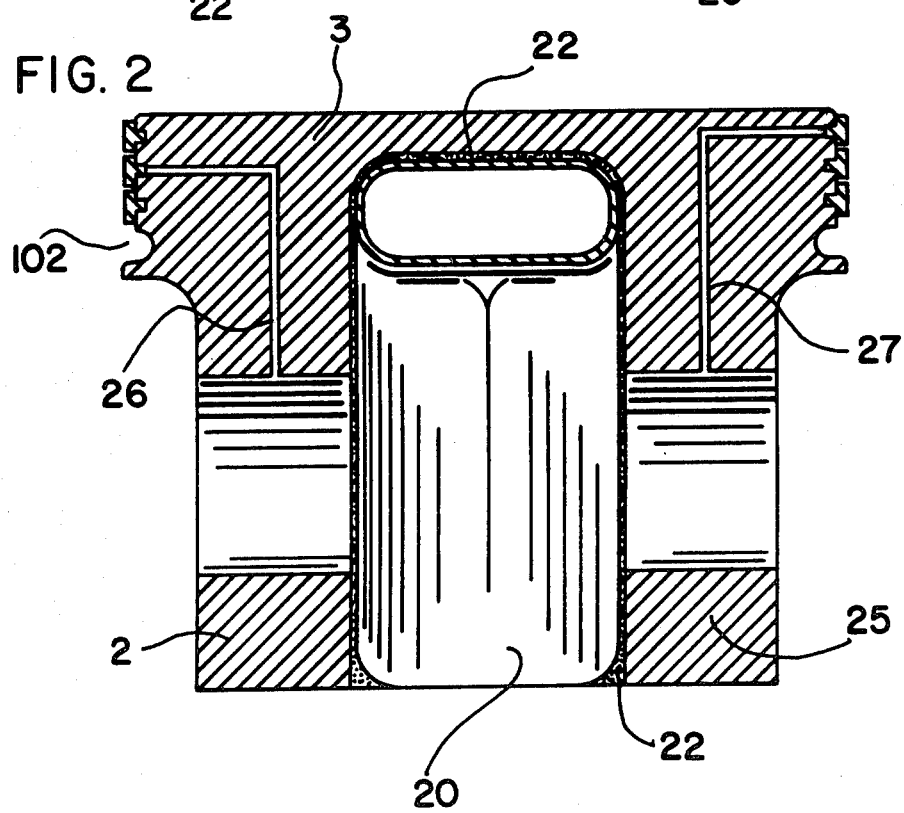
FIG. 2 is a central sectional view parallel to the wrist pin of the piston of FIG. 1, showing the geometry of the oil reservoir groove in the wrist pin boss area and showing a means of supplying some oil to the piston ring grooves.

FIG. 2 is a central sectional view parallel to the wrist pin 1 showing the geometry of the oil reservoir groove 102 and showing a means of maintaining some oil in the piston ring grooves to float the rings so that they can conform elastically to cylinder wall distortions and maintain oil control as required. In the journal bearing geometry of piston boss 2 and in its corresponding piston boss 25 are oil-feed holes 26 and 27 which feed oil into the piston ring grooves 4 and 5. It may be necessary to provide small ring-groove vents to the crank case to prevent excessive oil supply to the ring grooves, and these will be illustrated later. As the piston reciprocates, the fluctuating forces on the wrist pin generate strong fluctuating pressures in squeeze film mode in the wrist pin journal bearing area. These are useful to pump a small supply of oil to the ring grooves. This oil supply is necessary so that the groove-engaging portions of the rings can interact in squeeze film mode with the grooves 4, 5 and 6. The full oil film produced in this way eliminates static friction between piston grooves and the groove-engaging surfaces of the rings. This allows the rings freedom of radial motion.

Figure 3A:
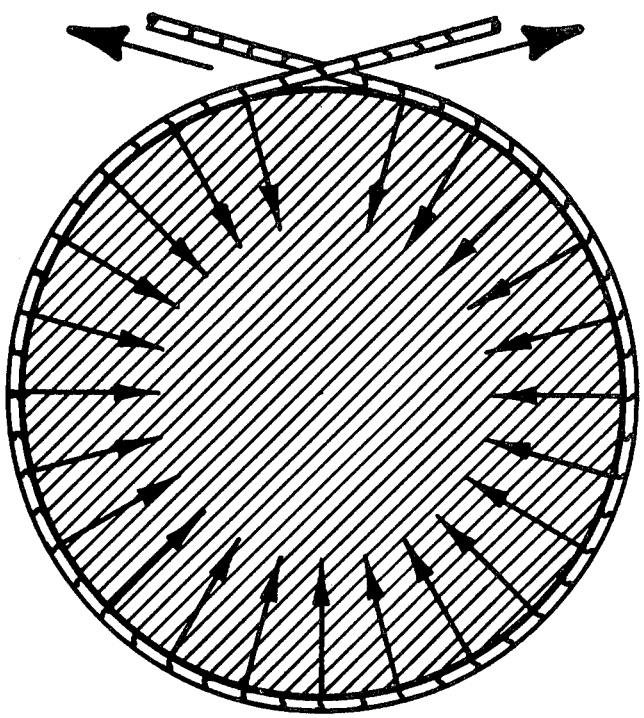
FIG. 3a illustrates a rope or flexible cable in tension around a cylinder, to illustrate the result that such a rope or cable, if the rope is very flexible and if friction between rope and cylinder can be ignored, will produce a uniform inward radial force around the circumference of the cylinder.

FIG. 3a illustrates a rope or flexible cable in tension around a cylinder, to illustrate the result that such a rope or cable, if the cable or rope is very flexible and if friction between rope and cylinder can be ignored, will produce a uniform inward radial force around the circumference of the cylinder. The force will be perpendicular to the surface at all points, and will vary inversely with the local radius of curvature of the shape that the rope is tied around if the "cylindrical" shape is not perfect. The ability of the piston rings and piston skirts to conform to the distortions of the cylinder wall and to the tiny geometrical variations required to maximize oil film pressure forces is analogous to that of the case of a rope around a cylinder.

The structural equations for tension and compression are exactly the same so long as buckling does not occur. In service, the piston rings are in circumferential compression. The rings are very flexible with respect to the deformations required of them. The relationship of a ring to the cylinder wall constrains buckling. In consequence the piston rings conform to very fine scales so as to produce outward forces perpendicular to the local cylinder surface and inversely proportional to the surface radius of curvature. Since the local radius of curvature of the cylinder wall varies very little, the rings put essentially uniform radial forces on the cylinder wall.

Figure 3B:
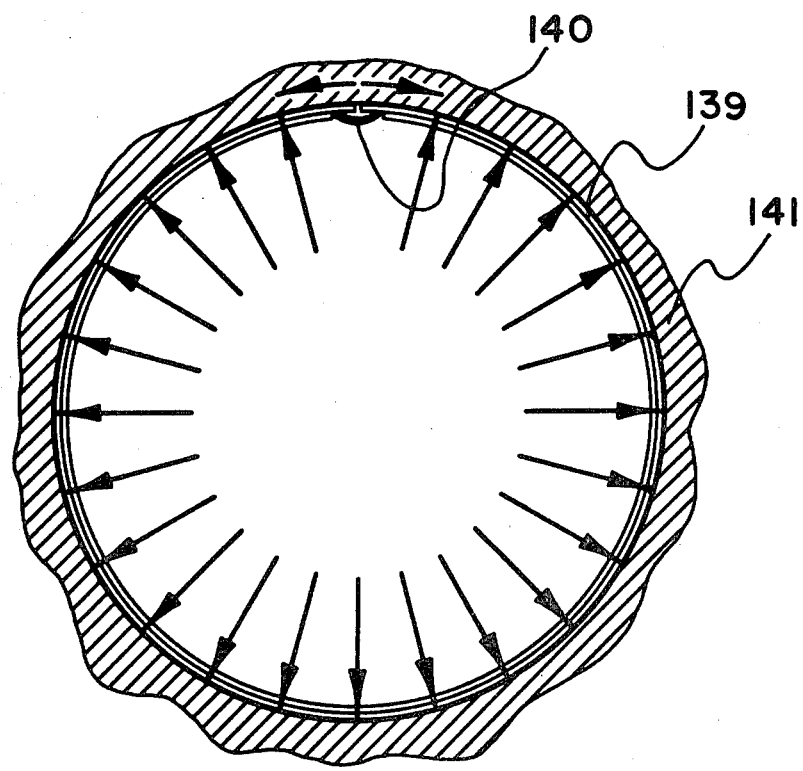
FIG. 3b is a schematic showing how a flexible ring in circumferential compression will conform to small cylinder distortions in such a fashion as to establish local radial force balances about the cylinder circumference.

FIG. 3b is a schematic showing how a flexible ring in circumferential compression will conform to small deformations to establish local radial force balances about the circumference. This schematic illustrates the reason the rings can conform elastically to produce the extremely fine-scale geometrical adjustments required to equalize full-film oil thicknesses around the ring circumference and produce oil control. Piston ring 139 is shaped and sized so as to have a much smaller bending moment of inertia than is conventional for rings. Ring 139 is loaded at the end gap with an end-gap separating spring 140 which serves to put ring 139 in circumferential compression. If ring 139 is contained in a perfectly shaped cylinder wall, and if friction between ring 139 and cylinder wall 141 (and between the ring and the groove) is negligible there will be a uniform radial outward force between the ring crown and the cylinder wall 141. If, on the other hand, cylinder wall 141 is not perfectly cylindrical, and ring 139 is initially round, there will be sections of the spring with excessive radial force and other unsupported sections with no radial force. It has been demonstrated by calculation that the ring will deform with respect to the distortions which occur on the cylinder wall or with respect to nonuniform forces produced by oil films so as to very closely (within plus or minus 5%) produce uniform outward radial forces around the circumference of the ring. The ring is flexible enough to accommodate cylinder out-of-round (which may amount to about $10^{-3}$ of the cylinder bore diamater) and can accommodate variations in bore out-of-round as the piston reciprocates axially. If the ring is floating in the grooves so that the rings are free to move radially, the rings can produce force balances requiring extremely fine and rapid radial adjustments. The fully free ring of the present invention can move to balance local oil film forces between the ring crown and the cylinder all around the ring circumference. This fine scale conformance is required for oil control and full film lubrication of the rings.

The fluid mechanics of the ring crown sliding against the cylinder with an oil film is such that change of a few microinches in clearance between ring crown and cylinder may produce a significant variation in oil film forces on the ring crown. The flexible ring is designed to very rapidly locally equilibrate these forces, increasing film thicknesses (and hence, reducing film pressures) when oil film pressures are excessive, and conversely thinning oil films (and increasing pressures) to achieve balance if the oil film pressure is too small. The geometrical accommodation between the ring crown and the cylinder wall to produce proper equilibration of the oil film forces requires extreme precision of the elastic characteristics of the ring. Oil film thicknesses between ring crown and cylinder wall may be as small as ten microinches. If the ring is free on an oil film in the grooves so that it can move radially with zero static friction this extreme precision of adjustment can be achieved, both on the average and at all points.

Figure 4:
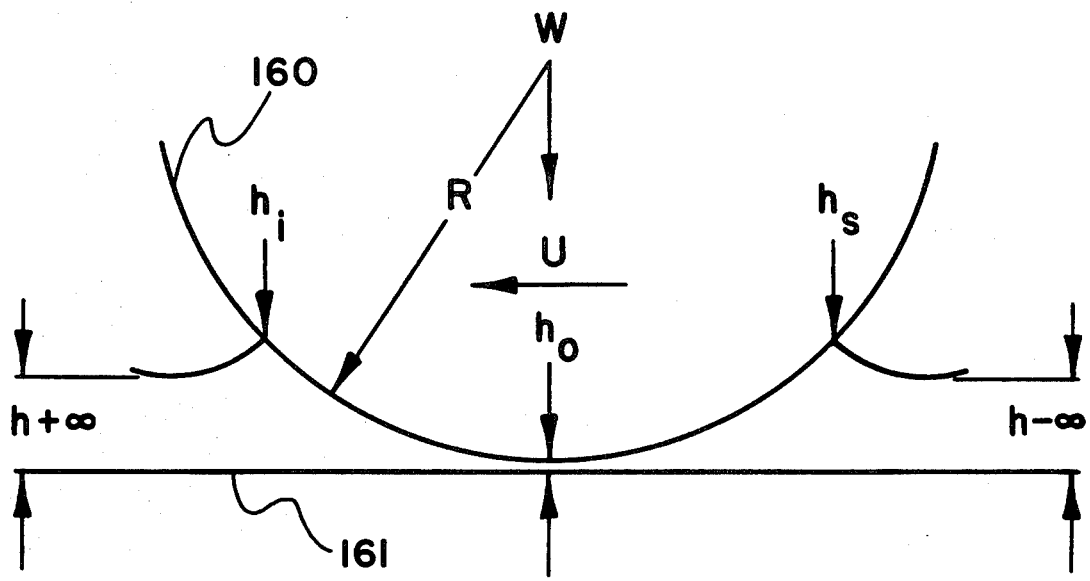
FIG. 4 shows a schematic of a cylinder sliding on a flat plate to illustrate the fluid mechanics relevant to the fully hydrodynamic elastically compliant piston ring crown sliding on the cylinder wall.

FIG. 4 is a schematic of a cylinder sliding on a flat plate to illustrate the fluid mechanics relevant to the fully hydrodynamic elastically compliant piston ring crown sliding on the cylinder wall. The film thicknesses between the ring crown and cylinder wall are so thin that the cylinder wall curvature has a negligible effect on the fluid mechanics between ring crown and cylinder wall. This cylinder 160 with radius R slides on flat plate 161 and moves to the left at a velocity U. An oil film thickness $h_{+\infty}$ covers the plate well ahead of the cylinder. Oil accumulated by the sliding cylinder forms maximum upstream film thickness $h_i$. The hydrodynamic fluid motions between cylinder and plate generate pressures as the film converges from $h_i$ to minimum film thickness $h_o$. After the film moves past minimum film thickness $h_o$ there is a divergence between cylinder and flat plate. The oil film slows down and separates in this divergent section. The film separates from the cylinder at a thickness $h_s$ and lays down a film of thickness $h_{-\infty}$ behind the sliding cylinder. A sense of the exaggeration of the vertical dimensions under the speeds and loads relevant to the piston ring case is important. Minimum film thickness $h_o$ near top and bottom dead center may be of the order of 10 microinches.

The convergence of oil between $h_i$ and $h_o$ generates a pressure (there is also some pressure contribution in the declining pressure zone of the divergent section) producing a film pressure force which is balanced by load W on the cylinder. If the load W is constant or determined by physics other than the fluid film physics (in the case of the piston rings the combination of spring and gas actuating forces) the cylindrical ring crown will adjust the distance $h_o$ until a force balance is established between load W and the countervailing oil film pressure force. For this to happen rapidly and at all localities around the circumference, a piston ring requires a flexible design fully floating in the grooves in the manner currently disclosed.

The relation of oil film pressure force to minimum film thickness $h_o$ and to film thicknesses $h_i$ and $h_{+\infty}$ is relevant. If $h_i$ is more than about 5 times $h_o$, further increases in $h_i$ have only small effects on the film pressure developed. Under these "flooded" conditions the pressure developed in the oil film is almost exactly proportional to $U/h_o$. The oil control ring, ring 14, operates on downstrokes in this flooded condition, since oil from the reservoir groove 101 assures that the oil control ring will be flooded with respect to downstrokes. The radius of curvature and spring load of the oil control ring 14 are arranged so that the thickness of oil film $h_{-\infty}$ laid down by the oil control ring always operates to run the compression rings 10 and 12 in an unflooded condition, where the oil film is fully hydrodynamic but "starved." It is necessary that the oil layers on which rings 10 and 12 reciprocate be sufficiently thin that they are "starved" so that these rings have a negligible tendency to pump oil to the top of the cylinder wall, but it also necessary to assure that there is a full film of lubricant with no metal-to-metal contact between the ring crowns of rings 10 and 12 and the cylinder wall. For this to be possible, it is necessary that all three rings float freely in the ring grooves so that the exact elastic deformations required to establish local force balances can occur in an unconstrained and very accurate fashion entirely around the circumference of each ring. When this is done on a cylinder wall having extremely smooth surfaces so that the high spots of the surfaces do not interrupt the oil film, it is possible to have a fully hydrodynamic piston ring pack which does not pump oil.

Figure 5:
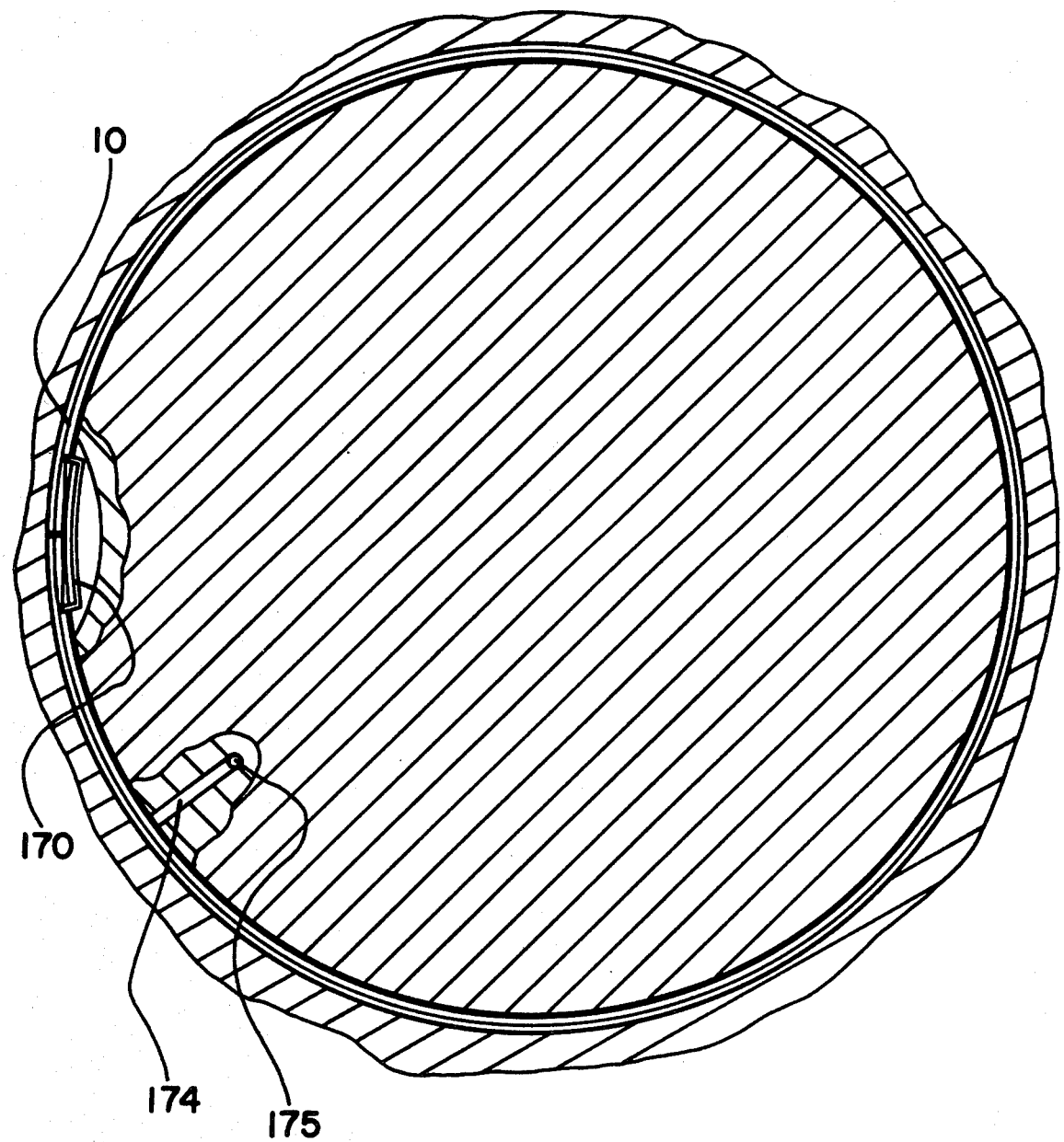
FIG. 5 shows a sectional view of A—A of FIG. 1 showing the flexible ring with end-gap loading by means of an end gap separating spring in line with the wrist pin.

FIG. 5 shows a sectional view on A—A of FIG. 1 showing the flexible ring 10 with end-gap loading via a spring 170 in line with the wrist pin. The second ring, ring 12, would have its end-gap and spring also in line with the wrist pin, but rotated 180°, and the oil control ring, ring 14, would have its end-gap spring in line with the end-gap of the ring 10 shown in FIG. 5. Since there is a small supply of oil to the ring grooves from the wrist pin, in the manner illustrated in FIG. 2, the ring grooves will float freely in squeeze film mode as the piston operates. This squeeze film situation occurs because there will be load reversal with respect to the grooves of the piston ring on every full cycle of the engine operation. This full load reversal in the presence of a supply of oil is a sufficient condition for squeeze film fluid mechanics and maintenance of the full oil film required to eliminate static friction and sticking between rings and grooves. FIG. 5 also shows an oil drain passage 174 and a pressure driven oil drain hole 175 which connects to the crankcase pressure at the bottom of the piston. This drain arrangement is necessary to keep oil feed passage 27 shown in FIG. 2 from overflooding the piston grooves. A similar drain arrangement rotated 180° is provided for the piston groove which mounts ring 12 (not shown).

Figure 6:
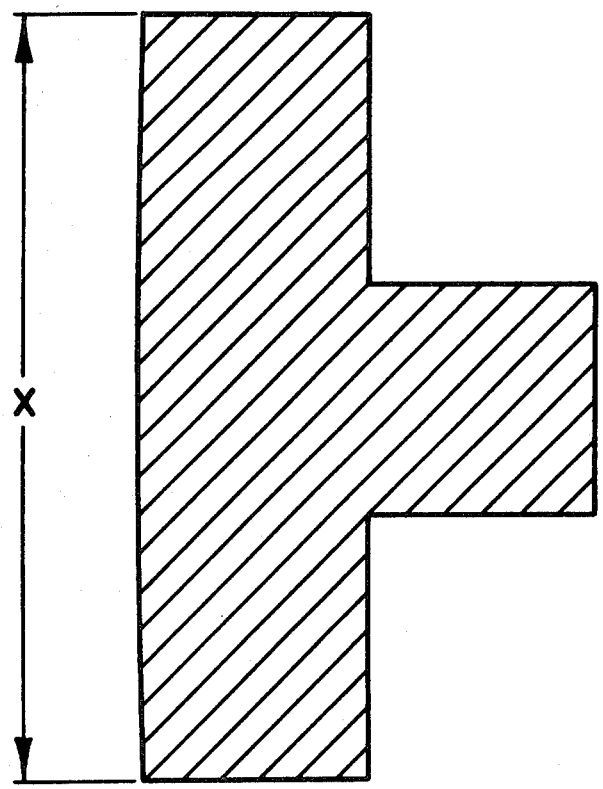
FIG. 6 shows an enlarged cross sectional view of the ring of FIG. 5.

FIG. 6 shows an enlarged cross sectional view of the ring of FIG. 8. It is required that the ring moment of inertia in bending be much less than that of typical rings. For example the ring may be scaled with the distance X shown in FIG. 6 equal to 0.1 inches (2.54 mm) with the other dimensions roughly proportional to those in the drawing. The more flexible the ring, the more readily the ring can conform to cylinder wall distortions when it is loaded in circumferential compression in the manner illustrated in FIG. 3b.

Figure 7:
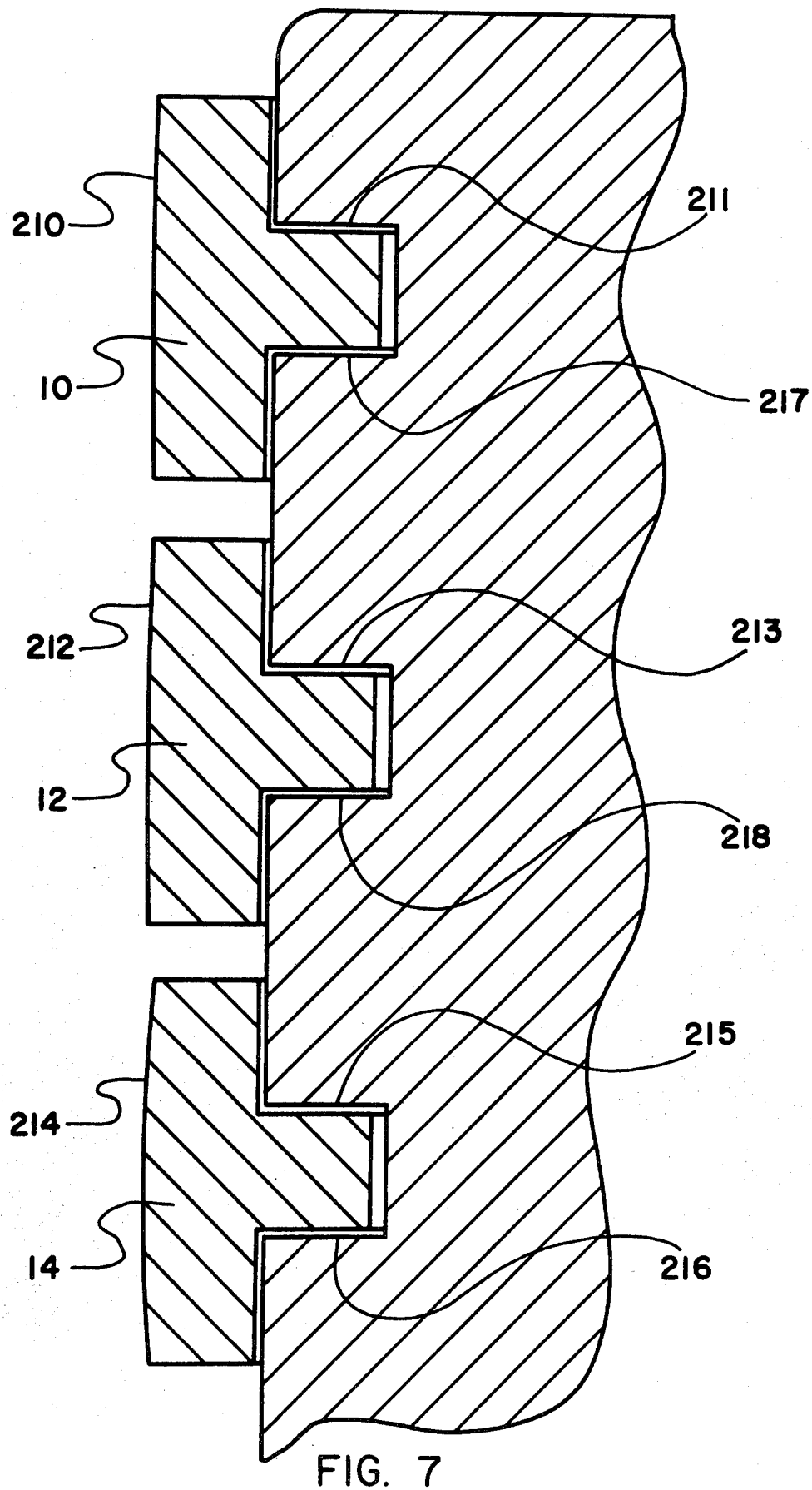
FIG. 7 is an enlarged cross sectional view of the three ring pack shown in FIG. 1 illustrating more particularly the differences between the rings.

FIG. 7 is an enlarged cross sectional view of the three-ring pack shown in FIG. 1 illustrating more particularly the differences between the rings. In the drawing rings 10 and 12 have a large (for example 2 inches) cylindrical crown radius of curvature (surfaces 210, 212) and the oil ring 14 has a cylindrical crown (surface 214) radius that is less than ¼ the crown radius of rings 10 and 12. Ring 14 functions to ration oil to rings 10 and 12 for oil control, but must assure that a sufficiency of oil is supplied to assure that rings 10 and 12 function in the fully hydrodynamic but starved regime during intake and exhaust strokes for low friction and negligible wear. It should be emphasized again that both the ring crown surfaces and the cylinder wall surface should be made as smooth as possible, preferably to an RMS value of a few microinches, so that the very thin oil films between ring crown and cylinder wall are not broken through by peaks and valleys in the surfaces. Even with great care it may, on occasion, happen that film breakdown between ring crowns and the cylinder walls occurs. This may happen particularly near top dead center piston position where gas actuating forces increase ring crown loads and where piston velocity vanishes on every cycle.

It may be useful to face the ring crown surfaces with a thin layer of tungsten carbide or similar very hard surface which is capable of being ground to the required smoothness. If this is done, it is likely that the extreme pressure additives in engine oils will act to smooth out any contacting peaks of the cylinder wall surface with negligible wear of the ring crown itself.

It is worthwhile to review a number of necessary conditions for the function of the flexible fully hydrodynamic rings, and to describe their function for oil control.

The ring crowns must be cylindrical so that the geometry of the oil film between the cylinder wall and the crowns does not vary as the piston rocks. The finish on the ring crowns and cylinder walls must be as smooth as possible, since even the best oil films will be very thin. The rings must conform elastically to very fine scales to produce local and dynamic equilibration of the ring crown load and oil film forces all around the circumference of the ring. For this to be possible, it is necessary for a full film of oil to be established between the ring groove surfaces (211, 217, 213, 218, 215, 216) and the groove-engaging surfaces of the rings.

Even with the best geometrical and elastic design, it is important to maximize the oil viscosity on which the rings operate, since the low viscosities characteristic of very hot engine oil are not sufficient to maintain oil films. In consequence, the heat transfer load of the rings must be held as low as possible so that oil film viscosity can be held within a tolerable range. The heat pipe equipped piston is capable of doing this. The heat pipe has the additional advantage of maintaining piston geometry in a fashion which produces good piston skirt cylinder wall geometry for full film fluid mechanics and minimum friction.

Another viscocity requirement concerns the issue of gasoline liquid sprayed on the cylinder walls. The viscosity of gasoline is unacceptably low for full film physics under the loads in which the piston rings must operate. It is therefore necessary to provide an arrangement which eliminates the supply of liquid phase gasoline to the cylinder walls, even under cold start conditions. Clearly, this is possible with propoane or natural gas engines, and is also possible with engines equipped with the mixing vortex owned by Automotive Engine Associates and disclosed in U.S. Pat. No. 4,318,386.

It is important that the elastic characteristics of the full film ring be arranged to produce instantaneous conformance of the ring crown with respect to the oil film and with respect to the large cylinder wall distortions which must be anticipated in service. The combination of a low bending moment of inertia ring in end-gap loading with constraints on buckling is sufficient to accomplish this.

With exact conformance of the ring crown to local cylinder wall surface distortions and local oil film forces, it is possible to apply analysis to design piston rings with low friction, essentially zero wear and good oil control. Referring again to FIG. 4, a quick review of the basic physics of cylinder on flat plate fluid mechanics relevant to the ring is worthwhile. The oil film thickness and load will be related to both geometry and the cavitation conditions in the ring.

In the range of oil film thicknesses relevant to the ring, oil flow past the ring is equal to $h_o U$ to within plus or minus 5%. For a set ratio $h_i/h_o$ and a set $P_{in}$, $h_o$ is proportional to R. This means that if oil control ring 14 and compression rings 10 and 12 were to operate with the same loads W, the minimum film thickness of oil control ring 14 would be smaller than those of rings 10 and 12. The small radius of curvature oil control ring 14 assures that rings 10 and 12 operate in a fully hydrodynamic, but somewhat "starved" condition most of the time. This is required for oil control.

The equilibrium film thickness and load W of an oil film is a function not only of geometry, but also of the pressures above and below the ring crown. The faster the oil film cavitates in the divergent part of the cylinder-flat plate geometry (the faster air bubbles come out of solution eliminating the negative pressure loop in the divergent section part), the higher the load bearing capacity of the ring will be for a set minimum oil film thickness $h_o$. The oil film on the cylinder wall rapidly reaches partial pressure equilibrium with the air or products of combustion which surround the oil film. This means that the partial pressure of air or other gases above the compression ring is consistantly greater than the partial gas pressure in the oil film below the compression ring. For this reason the oil film cavitates more rapidly on upstrokes, where the oil moves from a high ambient pressure to a low one, than on downstrokes, where the oil film moves from a low ambient pressure to a high one. This asymetry in cavitation conditions between upstrokes and downstrokes produces an equilibrium film thickness on upstrokes that is thicker than the equilibrium film thickness for the same ring loads on downstrokes. This asymetry tends to keep oil from being swept to the top of the cylinder wall, and is therefore useful for oil control.

In addition to the cavitation effect, the starvation of the rings 10 and 12 during the intake and exhaust stroke makes them "skate" in a manner where there is no net pumping of oil during the intake and exhaust strokes. Professor Harold Elrod of Columbia University has done a calculation illustrating that for sufficiently starved cylinders on flat plates, there is no net pumping of oil with motion of the rings.

Figure 8A:
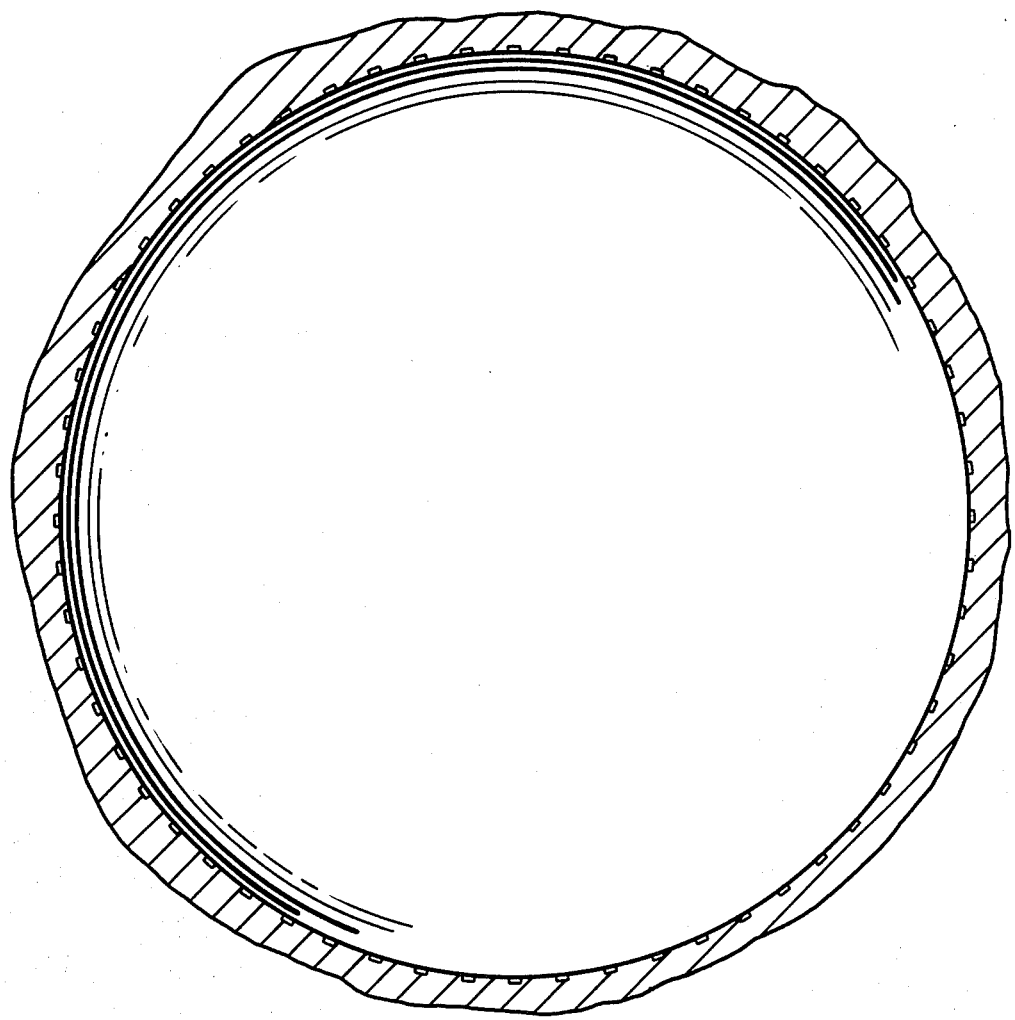
FIG. 8a is a top view of the cylinder showing blowdown grooves which may be used to assist oil control.
Figure 8B:
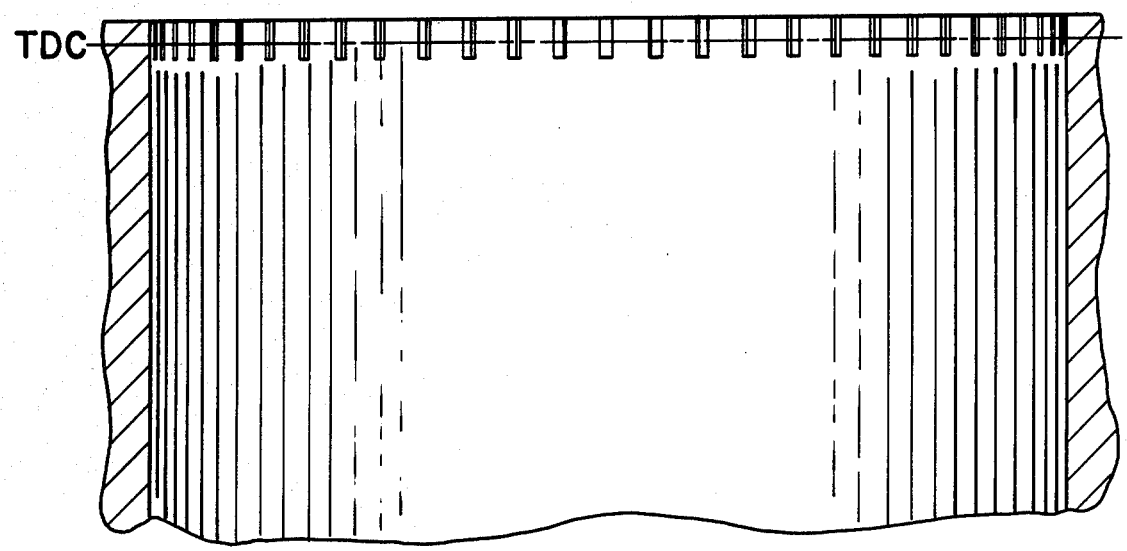
FIG. 8b is a centerline cutaway view of the cylinder wall further illustrating the blowdown grooves.

It is expected from calculation and indicated by some experimental results that proper design of the flexible ring pack will produce completely satisfactory oil control, but this is not experimentally verified for all conditions. However, it is possible to assure complete oil control of the assembly by providing the cylinder wall with axial grooves which function as timed blowdown valves to actively pump oil down from the vicinity of the top dead center top ring position. As has previously been discussed, it is desirable to finish the cylinder wall with the smoothest possible finish, preferably 2 to 3 microinches. Even with this very smooth finish, there may be a trade-off between film breakdown in the vicinty of top dead center and the ring starvation level required for oil control. To eliminate this trade-off, blowdown grooves can be used. FIGS. 8a and 8b illustrate the blowdown groove arrangement. FIG. 8a is a top view of the cylinder showing blowdown grooves which may be used to assist oil control. FIG. 8b is a centerline cutaway view of the cylinder wall further illustrating the blowdown grooves. All of the blowdown grooves can be simutaneously cut into the cylinder with a single tool in production with tightly controlled groove depth. It is desirable to have several hundred blowdown grooves evenly spaced circumferentially around the top of the cylinder wall. These blowdown grooves act as leakage paths between 10° before top dead center and 10° after top dead center for the top ring. The grooves should have a total circumference equal to approximately ¼ of the cylinder circumference, and a depth of approximately 0.5-1 thousandths of an inch. As the top ring sweeps above the blowdown grooves, a leakage path is established past the blowdown grooves. The leakage will actively blow down any excessive oil accumulation above the axial position of the groove and the cylinder wall. Because of the oil control ring and center ring, there will be little additional leakage due to the blowdown groove, but the blowdown grooves will assist in oil control.

Although the oil film thicknesses on the cylinder wall with the current invention rings will be much thicker than those of the current art rings, the film thicknesses will be sufficiently thin that no additional evaporation loss of oil is anticipated.

It has been shown how to produce a piston ring assembly utilizing elasticity and full film bearing physics which operates with radically lower friction than that of prior art piston ring assemblies.

It is claimed:

1. In a machine having a piston which reciprocates in a cylinder and mounts a wrist pin extending perpendicularly to the central axis of the cylinder, a connecting rod is operatively connected to the wrist pin and with its other end connected to an engine crankshaft by suitable bearing means, said piston having a top portion mounting a means for sealing the piston with respect to the cylinder wall as it reciprocates therein, where the piston has a piston skirt assembly having opposed thrust surfaces extending downwardly from the piston top for engaging the wall of the cylinder in the manner of hydrodynamic bearings to support side thrust forces and to limit the angle of rocking of the piston within the cylinder, the piston being provided with a first peripheral groove in its upper portion, said groove having parallel upper and lower walls terminating in a back wall, a first sealing member having a "T" shaped cross section with the base of the T riding in the space between the upper and lower groove walls on a film of lubricant for free radial movement therein, said first sealing member being flexible with respect to cylinder wall deformations and having spring means operatively cooperating with the first sealing member whereby said first sealing member will conform on a scale relevant to the fluid mechanics of the lubricant film between the sealing member and the cylinder wall to any cylinder wall distortion which occurs in piston engine practice, that portion of the first sealing member engaging the lubricant film on the cylinder wall being curved to form a barrel-like crown surface along an arc parallel to the cylinder axis having a radius of curvature large enough so said surface acts as a good hydrodynamic bearing in interaction with the lubricant film on the cylinder wall, said barrel-like crown surface having a small enough radius of curvature so that said crown contacts the thin lubricant film covering the cylinder wall over the full range of rocking of said piston in the cylinder, the piston being provided with a second peripheral groove in its upper portion, said groove having parallel upper and lower walls terminating in a back wall, a second sealing member having a "T" shaped cross section with the base of the T riding in the space between the upper and lower groove walls on a film of lubricant for free radial movement therein, said second sealing member being flexible with respect to cylinder wall deformations and having spring means operatively cooperating with the second sealing member whereby said second sealing member will conform on a scale relevant to the fluid mechanics of the lubricant film between the second sealing member and the cylinder wall to any cylinder wall distortion which occurs in piston engine practice, that portion of the second sealing member engaging the lubricant film on the cylinder wall being curved to form a barrel-like crown along an arc relatively parallel to the cylinder axis with said crown radius of curvature smaller than that of the first sealing member to form a barrel-like surface acting as a good hydrodynamic bearing in interaction with the lubricant film on the cylinder wall, wherein all of the surfaces of said piston-seal assembly which slide against the lubricant film on the cylinder wall act in combination to leave a layer of lubricant on said cylinder wall sufficiently thick so that the sliding surface of said sealing members function in interaction with the cylinder wall as hydrodynamic bearings in the fully flooded or starved full film regime with substantially no cycle time for said sealing member surfaces in the boundary lubrication regime.

2. The invention as set forth in claim 1 and wherein each sealing member is a ring and, each ring has a single cut completely through its cross section providing an end gap, each ring has cross sectional dimensions small enough so that the ring is flexible and still sufficiently strong that it will withstand the pressure forces to which it is subjected in its functioning environment, and being adapted to mount a spring which spans the end gap to expand the end gap whereby the ring is placed in circumferential compression so that the elastic deformations of the ring-spring system interact whereby the ring crown surface will conform on a scale relevant to the fluid mechanics of the lubricant film between said crown and the cylinder wall and conform to any cylinder wall distortion which occurs in internal combustion engine practice.

3. The invention as set forth in claim 2 and wherein each ring is freely supported in its respective groove and elastically arranged so that its ring crown very rapidly and continuously moves to establish local force equilibria between the ring crown and the oil film on the cylinder wall throughout the circumference of said cylinder wall, the lowermost ring having a radius of crown curvature less than the ring above it, means in the piston to supply oil to the cylinder wall below the lower ring whereby said lower ring operates in the flooded lubrication regime on downstrokes whereby the oil film on the cylinder wall following down travel of the lowermost ring is a thin continuous film which constitutes the proper oil supply so that the upper ring slides on said oil film in the fully hydrodynamic but partly starved lubrication regime through the intake and exhaust strokes.

4. The invention as set forth in claim 1 and wherein in each sealing member is a ring whose crown surface is highest at its center with respect to the cylinder axis and wherein the base of the T riding in its respective groove is likewise centered and has parallel surfaces which together with the coacting groove walls have smooth and flat surfaces.

5. The invention as set forth in claim 4 and wherein means are provided to deliver sufficient oil into the respective grooves so that each ring's base riding in its respective groove interacts to form a squeeze film between respective base and groove surfaces so that each ring is free to conform radially to cylinder wall distortions and varying oil film-crown forces.

6. The invention as set forth in claim 1 and wherein there are three sealing members and cooperating piston grooves and further wherein the top two sealing members are identical in structure.

7. The invention as set forth in claim 1 and wherein the surface finish of the cylinder wall and the coacting surface finish of the sealing member's crowns have surface character heights small enough so that the lubricant film breakdown between said crown surfacs and said cylinder wall will not occur under flooded lubrication conditions for said second sealing member during piston downstrokes of any instantaneous operating condition which occurs during operation of piston.

8. The invention as set forth in claim 1 and wherein the piston is provided with a groove extending completely around the periphery of the piston immediately below the lowermost piston sealing member groove to serve as a reciprocating oil resevoir to assure adequate oil supply to said second sealing member during piston downstrokes.

9. The invention as set forth in claim 1 and wherein the oil film on the cylinder wall following down travel of the lowermost ring is thin enough so that there is no net pumping of oil to the top of the cylinder wall as the piston reciprocates.

10. The invention as set forth in claim 1 and wherein the barrel-like crown surfaces are constructed of a hard, wear resistant material.

11. The invention as set forth in claim 1 and wherein the cylinder in which the piston reciprocates has a large number of uniformly spaced shallow axial grooves on its top portion, so that leakage paths are established between the cylinder wall and the crown surface of said first sealing member when the piston is near is top dead center position, whereby said leakage paths serve to blow down any oil which might otherwise accumulate at the top of the cylinder.

12. The invention as set forth in claim 1 and wherein the piston is provided with cooling means which hold said piston approximately isothermal and serve to minimize the portion of the heat from the top of said piston which is tranferred across the crowned surfaces of said sealing members of the cylinder wall.

* * * * *